United States Patent [19]
Kang

[11] Patent Number: 6,034,990
[45] Date of Patent: Mar. 7, 2000

[54] DIGITAL RADIO TRANSMISSION AND RECEPTION SYSTEM APPLYING A DIRECT MODULATION AND DEMODULATION METHOD

[75] Inventor: Keun-Mo Kang, Incheonkwangyeok, Rep. of Korea

[73] Assignee: Samsung Electronics Co., Ltd., Kyungki-do, Rep. of Korea

[21] Appl. No.: 08/917,066

[22] Filed: Aug. 25, 1997

[30] Foreign Application Priority Data

Aug. 24, 1996 [KR] Rep. of Korea ....................... 96-35461

[51] Int. Cl.[7] ...................................... H04B 1/44
[52] U.S. Cl. .......................... 375/219; 375/278; 375/296; 375/303; 375/334; 455/83; 455/87; 455/208; 455/318; 332/100
[58] Field of Search .................................. 375/219, 296, 375/272, 303, 326, 327, 328, 339, 334, 344, 278; 455/78, 82, 83, 84, 85, 86, 208, 87, 378; 332/100

[56] References Cited

U.S. PATENT DOCUMENTS

| 4,570,125 | 2/1986 | Gibson . | |
|---|---|---|---|
| 5,311,556 | 5/1994 | Baker . | |
| 5,319,799 | 6/1994 | Morita | 455/78 |
| 5,511,236 | 4/1996 | Umstattd et al. | 455/76 |
| 5,550,505 | 8/1996 | Gaus, Jr. . | |
| 5,862,181 | 1/1999 | Ishizuka | 375/259 |

*Primary Examiner*—Amanda T. Le
*Attorney, Agent, or Firm*—Robert E. Bushnell, Esq.

[57] ABSTRACT

A digital radio transmission and reception system capable of preventing shift of carrier by fading through receiving a modulated signal radio-transmitted, and then directly demodulating the signal. The digital radio transmission and reception system applying a direct modulation and demodulation method, including: a receiving part for selectively receiving a signal of a desired channel band, amplifying the received signal, mixing the selectively amplified signal with carrier frequency, subtracting a modulated signal in which eliminates the carrier frequency, and then comparing the signal with a reference level signal, thereby outputting demodulated digital; a transmitting part for power amplifying a demodulated transmitting signal, filtering spurious components and then outputting the filtered; a transmission and reception control switch for connecting the antenna to the transmitting part or the receiving part according to an input of a transmission and reception mode signal; a phase locked loop modulator for oscillating the carrier frequency corresponding to an oscillation control signal, outputting the oscillated carrier frequency, frequency shift keying modulating transmitting data as frequency of the carrier frequency band, thereby outputting the data; a second transmitting selection switch for switching an output of the phase locked loop modulator to the transmitting part or receiving part according to the transmitting mode control signal; and, a control part for detecting the amount of frequency offset of receiving data demodulated in the receiving part or monitoring a state of the carrier frequency oscillated from the phase locked loop modulator, thereby generating an oscillation control signal to constantly maintain the oscillated carrier frequency as well as a transmission and reception mode signal according to an operational state.

19 Claims, 2 Drawing Sheets

DIGITAL RADIO TRANSMISSION AND RECEPTION SYSTEM APPLYING A DIRECT MODULATION AND DEMODULATION METHOD

CLAIM OF PRIORITY

This application makes reference to, incorporates the same herein, and claims all benefits accruing under 35 U.S.C §119 from an application entitled Digital Radio Transmission And Receipt System Applying Direct Modulation And Demodulation Method earlier filed in the Korean Industrial Property Office on Aug. 24, 1996, and there duly assigned Ser. No. 96-35461 by that Office.

BACKGROUND OF THE INVENTION

1. Field of the Invention

The present invention relates to a radio transmission and reception system for transmitting and receiving digital data by radio, and in particular, to a digital radio transmission and reception system applying a direct modulation and demodulation method.

2. Description of the Related Art

In general, a digital radio transmission and reception system modulates digital data for transmission as an analog type to thereby transmit the modulated digital data by radio, as well as to receive the radio-transmitted signal to thereby demodulate the received signal into digital data. Here, for example, a frequency shift keying (hereinafter, referred to as FSK) modulation, a phase shift keying (hereinafter, referred as to PSK) modulation, and etc. are widely used to modulate the digital data. An example of a FSK modulator and demodulator is described in U.S. Pat. No. 5,311,556 to William E. Baker and entitled Digital FSK Transmitter Receiver And Method Of Operating Same, and examples of different FSK demodulators are described in U.S. Pat. No. 5,550,505 to Richard C. Gaus, Jr., and entitled Frequency Shift Keying (FSK) Demodulator For use In Low Signal-To-Noise Ratio Environments and U.S. Pat. No. 4,570,125 to Rodney W. Gibson and entitled FSK Demodulator With Concurrent Carrier And Clock Synchronization.

One use of a digital radio transmission and reception system is for a digital cordless telephone widely used in a mobile radio communication network or a private radio switching network. The aforesaid digital cordless telephone forms a radio terminal having functions for modulating the digital data into an analog signal to thereby transmit the modulated digital data (the analog signal), as well as to receive the analog signal by radio to thereby demodulate the received analog signal into the digital data. The aforesaid digital data includes speech signals as the analog signals belonging to an audible frequency band or tone signals for link setting. Representatively, an embodiment of the above digital cordless telephone can be a digital European cordless telephone.

The transmitting part and the receiving part of a digital European cordless telephone, however, includes a complicatedly constructed frequency processing circuit because it uses a single frequency conversion method or a dual frequency conversion method. Therefore, there is a problem with the digital European cordless telephone in that it is difficult to manufacture miniaturized and low-priced terminals required for cordless telephones. Besides, there is frequently generated phenomenon that frequency shift keying of the receiving signal is incapable of correction due to fading in an area where there are many obstacles, such as residential buildings. Therefore, during "open loop" conversion to transmit the data having a constantly equal logic level, for example, data "1111" or "0000", a problem may occur of momentary frequency skip of a voltage controlled oscillation signal generated when a difference in phase is set to "high impedance" through allowing a phase locked loop to be under a state of power down.

SUMMARY OF THE INVENTION

It is therefore an object of the present invention to provide a digital radio transmission and receipt system capable of preventing shift of carrier by fading through receiving a modulated signal radio-transmitted, and then directly demodulating the signal.

It is another object of the present invention to provide a digital transmission and reception system, when modulating a function for restoring a phase locked loop frequency according to a frequency shift keying of a transmitting carrier, which is capable of controlling frequency of a reference signal generator, controlling the frequency up to error generated by restoration of the frequency, and then modulating a transmitting signal.

To achieve the above objects, there is provided with a digital radio transmission and reception system applying a direct modulation and demodulation method, including: a receiving part for selectively receiving a signal of a desirous channel band, amplifying the received signal, mixing the selectively amplified signal with carrier frequency, subtracting a modulated signal in which eliminates the carrier frequency, and then comparing the signal with a reference level signal, thereby outputting demodulated digital; a transmitting part for power amplifying a demodulated transmitting signal, filtering spurious components and then outputting the filtered signal; a transmission and reception control switch for connecting the antenna to the transmitting part or the receiving part according to an input of a transmission and reception mode signal; a phase locked loop modulator for oscillating the carrier frequency corresponding to an oscillation control signal, outputting the oscillated carrier frequency, frequency shift keying modulating transmitting data as frequency of the carrier frequency band, thereby outputting the data; a second transmitting selection switch for switching an output of the phase locked loop modulator to the transmitting part or receiving part according to the transmitting mode control signal; and, a control part for detecting the amount of frequency offset of receiving data demodulated in the receiving part or monitoring a state of the carrier frequency oscillated from the phase locked loop modulator, thereby generating an oscillation control signal to constantly maintain the oscillated carrier frequency as well as a transmission and reception mode signal according to an operational state.

BRIEF DESCRIPTION OF THE DRAWINGS

More complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, numeral specific details such as components and frequencies of the concrete circuit, are set forth to provide a more thorough understanding of the present invention. It will be apparent, however, to one skilled in the art that the present invention may be practiced without these specific details. The detailed description of known function and constructions unnecessarily obscuring the subject matter of the present invention will be avoided in the present invention.

Figure 1:
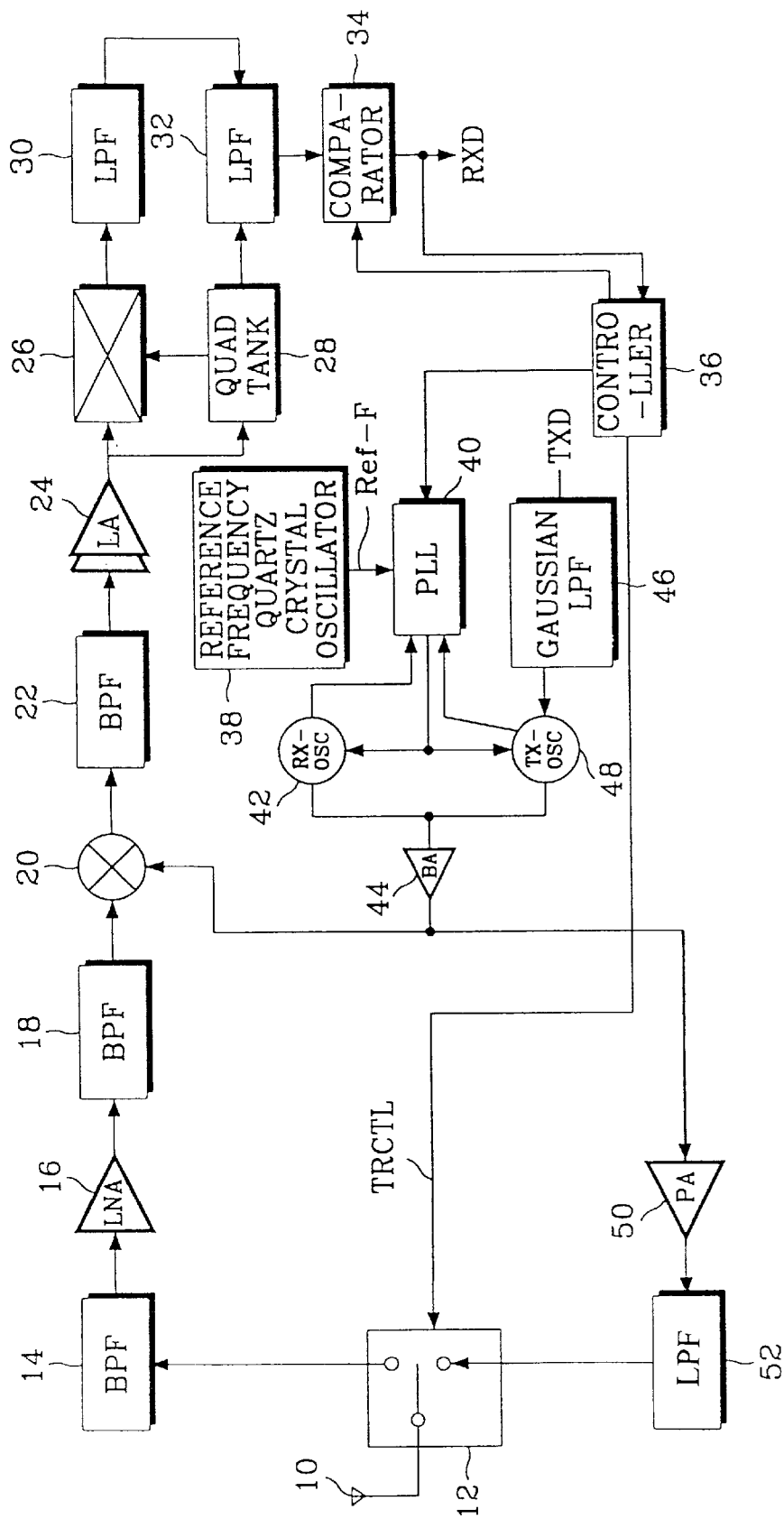
FIG. 1 is a block diagram showing an exemplary digital radio transmission and reception system applying a single conversion method.

FIG. 1 is a block diagram showing an exemplary digital radio transmission and reception system applying a single conversion method, which includes: a transmitting and receiving antenna; a receiving part connected to the antenna, for intermediate frequency amplifying only a signal of a desirous channel of a plurality of receiving signals, thereby demodulating the above signal and then outputting it; a transmitting part for FSK modulating data to be transmitted to the signal belonging to a previously set frequency band and power amplifying the modulated transmitting signal, thereby outputting the power amplified transmitting signal; a transmitting and receiving control switch for connecting the antenna to the receiving part or the transmitting part according to an input of a transmitting and receiving control signal; and, a controller for control transmitting and receiving modes of the digital cordless telephone.

The receiving part, as shown in FIG. 1, is comprised of an antenna 10; a transmitting and receiving control switch 12; band pass filters (hereinafter, referred to as BPF) 14, 18, and 22; a low noise amplifier (hereinafter, referred to as LNA) 16; mixers 20 and 26; a limit amplifier (hereinafter, referred to as LA) 24; a quad tank 28; low pass filters (hereinafter, referred to as LPF) 30 and 32; a comparator 34; a reference frequency quartz crystal oscillator 38, a phase locked loop (hereinafter, referred to as PLL) 40; a receiving oscillator (RX-OSC) 42; and, a buffer amplifier 44. Additionally, the transmitting part is comprised of antenna 10; transmitting and receiving control switch 12; PLL 40; a Gaussian LPF 46; a transmitting oscillator (TX-OSC) 48; buffer amplifier 44; a power amplifier (hereinafter, referred to as PA) 50; and a LPF 52.

Referring now to FIG. 1, an operation and structure of the digital cordless telephone will be in detail explained hereinafter.

When the circuit of FIG. 1 starts performing its operation, reference frequency quartz crystal oscillator 38 generates a reference frequency Ref-F and provides the oscillated reference frequency Ref-F to PLL 40. PLL 40 detects the difference between a phase of the reference frequency Ref-F and a phase of a frequency output from transmitting oscillator 48 (TX-OSC), an outputs a resulting oscillating control voltage to transmitting oscillator (TX-OSC) 48 and receiving oscillator (RX-OSC) 42. Here, transmitting oscillator (TX-OSC) 48 and receiving oscillator (RX-OSC) 42 are constructed as voltage controlled oscillators (hereinafter, referred to as VCO). Therefore, an output of transmitting oscillator (TX-OSC) 48 and an output of receiving oscillator (RX-OSC) 42 are phase synchronized signals phase synchronized to reference frequency Ref-F. A control signal PLL-CTL as a signal for selecting transmitting and receiving channels, which is output from controller 36 and provided to PLL 40, is provided to a frequency divider deposited in PLL 40.

As is apparent from the foregoing, when transmitting data TXD is input in condition that a loop of the PLL is formed, transmitting data TXD is input to Gaussian LPF 46. In order to prevent spurious components generated when the digital data is modulated, Gaussian LPF 46 filters the spurious components included in the input transmitting data TXD, thereby providing the filtered signal to transmitting oscillator (TX-OSC) 48. Transmitting oscillator (TX-OSC) 48 oscillates an oscillation control voltage output from PLL 40 and frequency corresponding to the control signal mixed by the transmitting data TXD output from Gaussian LPF 46, and then provides the oscillated oscillation control voltage and the frequency to buffer amplifier 44. The transmitting data TXD can be FSK modulated in a desired frequency band through the above stated operations.

After buffering in buffer amplifier 44, the aforesaid FSK modulated signal is amplified to a signal having strength set by PA 50. The power amplified transmitting signal is provided to LPF 52. LPF 52 low pass filters the input transmitting signal, thereby eliminating harmonic components generated when performing an operation of amplifying by PA 50. An output of LPF 52 is selectively connected to antenna 10 by transmitting and receiving control switch 12 being switched according to a transmitting and receiving mode control signal TRCTL output from controller 36. Therefore, when transmitting and receiving mode signal TRCTL is under a state of a transmitting mode, the output of LPF 52 will be radio-transmitted via antenna 10.

A signal received via the antenna 10 is input to the first BPF 14 via the transmitting and receiving control switch 12. At this time, transmitting and receiving mode control signal TRCTL, output from the controller 36, is a receiving mode signal. BPF 14 filters out everything but a signal belonging to a previously set frequency band of the received signals connected via antenna 10, and then provides the filtered signal to LNA 16. LNA 16 amplifies a weakly received signal, thereby providing the amplified signal to mixer 20 via BPF 18. Mixer 20 also receives a local oscillation signal from receiving oscillator (RX-OSC) via buffer amplifier 44. The signal passed by BPF 18 is mixed with the local oscillation signal by use of mixer 20, thereby generating a frequency converted intermediate frequency signal. The generated intermediated frequency signal is provided to BPF 22 in which the frequency band is previously set. BPF 22 eliminates the spurious components generated when the receiving signals and the local oscillation signal are mixed by the non-linearity characteristic of mixer 20, and then provides an output to LA 24. Though the strength of the input signal changes, LA 24 can constantly maintain the strength of the output signal for input to mixer 26 and quad tank 28.

Quad tank 28 phase converts an output of LA 24 by 90°, and provides the phase converted output to mixer 26. Here, mixer 26 mixes the outputs of LA 24 and quad tank 28, thereby demodulating only a modulated signal and eliminates a radio frequency carrier. The signal demodulated by mixer 26 is continuously provided to LPFs 30 and 32 connected in series to the output terminal of the mixer 26, and then the provided signal is filtered. LPFs 30 and 32 are filters to eliminate noise components included in the demodulated signal. The filtered demodulated signal is input to comparator 34 for comparison to an input a reference level signal provided by controller 36. Comparator 34 compares the demodulated signal with the reference level signal such that, if a level of the demodulated signal is higher than a level of the reference level signal, comparator 34 outputs a digital data signal having a logic "high" level while if the level of the demodulation signal is lower than that of the reference level signal, the comparator 34 outputs a digital data signal having a logic "low" level. Accordingly, the digital data signal is completely demodulated and output as the receiving data RXD.

Figure 2:
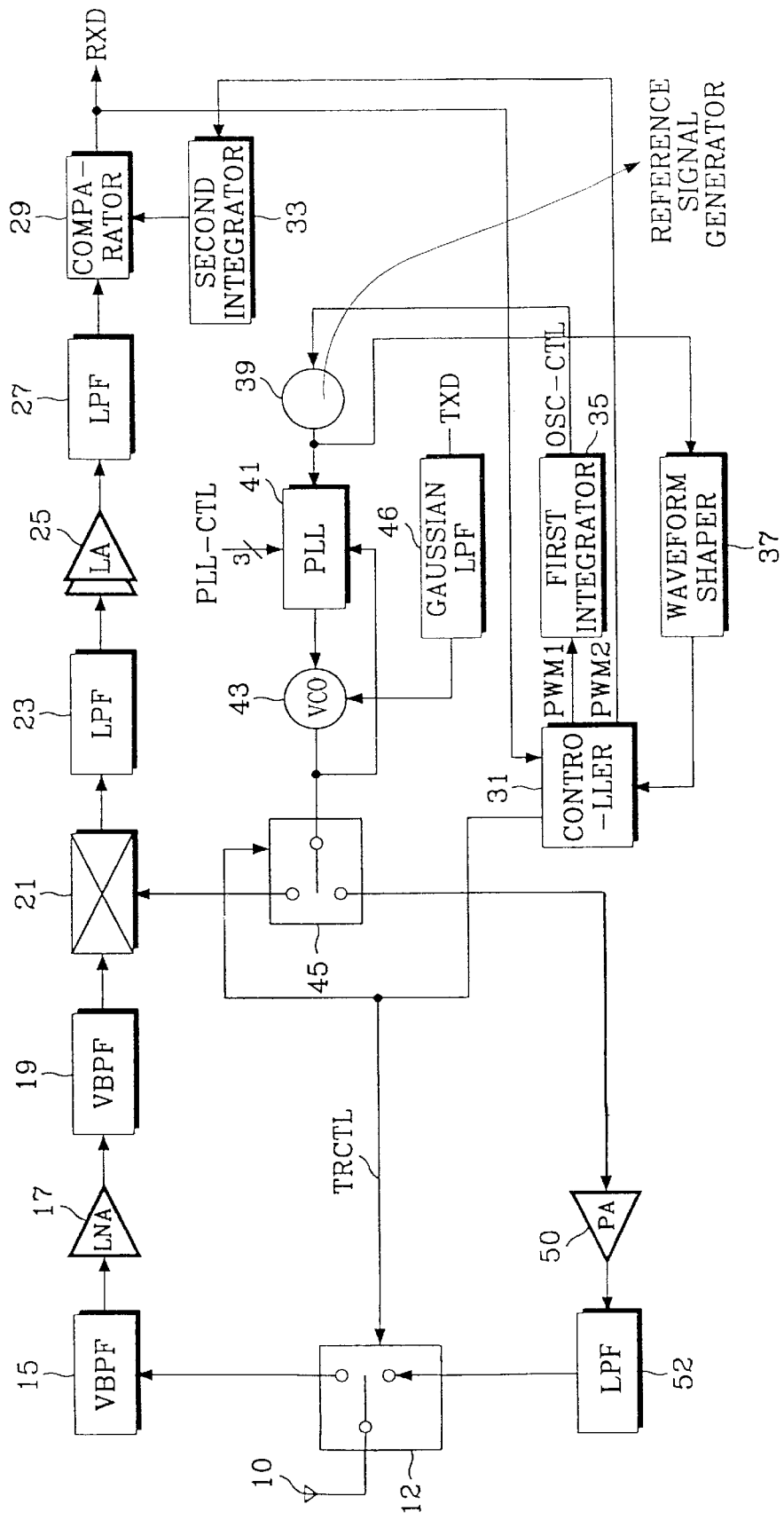
FIG. 2 is a block diagram showing a digital radio transmission and reception system applying a direct modulation

FIG. 2 is a block diagram showing a digital radio transmission and reception system applying a direct modulation and demodulation method according to a preferred embodiment of the present invention, which includes a transmitting part, a receiving part, a phase locked loop modulation part, and, a control part for controlling overall operations of a system.

The transmitting part as shown in FIG. 2 is comprised of: a PA 50 for power amplifying frequency shift keying modulated signal; a LPF 52 for eliminating spurious components through low pass filtering the power amplified signal; a transmitting and receiving control switch 12 switched according to the logic level state of a transmitting and receiving mode control signal TRCTL; and, an antenna 10 connected to the transmitting and receiving control switch 12.

Additionally, the receiving part is comprised of: a first variable BPF (hereinafter, referred to as VBPF) 15 for filtering and outputting only a signal of a desired channel of receiving signals; a LNA 17 for low noise amplifying an output of VBPF 15; a second VBPF 19 for filtering only a signal of a desired channel of the low noise amplified receiving signals; a harmonic frequency mixer 21 for mixing the output of VBPF 18 and a carrier frequency, thereby eliminating the receiving carrier frequency, as well as outputting a signal demodulated by eliminating the spurious components generated when mixing the frequencies; LPFs 23 and 27, and a LA 25 for eliminating high frequency noise through low pass filtering the demodulated receiving signal, as well as constantly maintaining an output level of the demodulated signal; and, a comparator 29 for comparing an output of LA 25 with a reference level signal, thereby outputting receiving data RXD restored to a digital signal.

The phase locked loop modulation part is comprised of: a reference signal generator 39 for generating a reference oscillating signal Ref-F corresponding to an oscillation control signal OSC-CTL and then, outputting it; a VCO 43 for oscillating the carrier frequency corresponding to an oscillation control voltage and FSK modulating transmitting data to a frequency band of the carrier; a PLL 41 corresponding to a difference between a phase of the generated reference signal Ref-F and the a phase of the frequency of the oscillation output of VCO 43; a selection switch 45 for selectively outputting the oscillation output of VCO 43 to harmonic mixer 21 or to PA 50, according to the transmitting and receiving mode control signal TRCTL; and, a Gaussian LPF 46 for low pass filtering the transmitting data, thereby eliminating the spurious components. Here, PLL 41 is conventionally comprised of a frequency divider for frequency dividing the reference signal Ref-F by the channel control signal PLL-CTL and a phase detector.

The control part is comprised of: a waveform shaper 37 for waveform shaping reference signal Ref-F generated from the reference signal generator 39, thereby outputting the waveform shaped signal as a binarization signal; a controller 31 for outputting the transmitting and receiving mode control signal corresponding to the transmitting and receiving mode, as well as calculating a frequency offset of the receiving signal output from comparator 29, thereby simultaneously outputting an oscillation control pulse and a preset bit decision control pulse, monitoring the output of waveform shaper 37, and then outputting the oscillation control pulse corresponding to the variation amount of reference signal Ref-F; a first integrator 35 for integrating the oscillation control signal OSC-CTL, thereby providing the oscillation control voltage to reference signal generator 39; and, a second integrator 33 for integrating the bit decision control pulse, thereby providing the reference level to comparator 29.

With reference to the above stated description, an operation of the digital radio transmission and reception system applying a direct modulation and demodulation method according to the present invention will now be explained hereinafter, with the transmitting mode and the receiving mode.

When the digital radio transmission and reception system shown in FIG. 2 starts performing its operation to the transmitting mode, controller 31 outputs the previously set oscillation control pulse PWM1. The oscillation control pulse PWMI is low pass filtered by an integrating operation of integrator 35 and output as a direct current voltage. The direct current voltage is provided to reference signal generator 39 as the oscillation control signal OSC-CTL. Here, reference signal generator 39 oscillates reference signal frequency Ref-F corresponding to the voltage level of oscillation control signal OSC-CTL and outputs the oscillated Ref-F to PLL 41 and waveform shaper 37. Waveform shaper 37 outputs a signal of a square wave to controller 31 through waveform shaping of the reference signal frequency Ref-F.

Controller 31 monitors the square wave output from waveform shaper 37. For example, controller 31 checks a period of reference signal frequency Ref-F converted into the square wave, and then checks whether or not the period of the reference signal frequency Ref-F is changed. When checked that the reference signal frequency Ref-F was changed, controller 31 converts a duty of oscillation control pulse PWM1 in correspondence with the variation amount of reference signal frequency Ref-F, and then outputs it. In an initial state, reference signal frequency Ref-F oscillated and output from reference signal generator 39, is hardly converted, that is, the above reference signal frequency Ref-F is constantly maintained, and then output.

PLL 41 frequency divides reference signal frequency Ref-F in correspondence with control signal PLL-CTL output from controller 31, for example, the signal for selecting a channel. And then, PLL 41 detects the difference between the phase of the frequency-divided reference signal frequency Ref-F and the phase of the frequency of the signal output by VCO 43 which is input via another input terminal, and provides an oscillation control voltage corresponding to the detected difference therebetween to VCO 43 connected to an output node. VCO 43 oscillates the carrier frequency corresponding to the oscillation control voltage output from PLL 41, and then outputs it. As stated above, the carrier frequency oscillated and output from VCO 43 is provided to the selection switch 45 as well as input to PLL 41. Therefore, when the previously set oscillation control pulse PWM1 is output from the controller 31, the phase locked loop modulator comprised of reference signal generator 39, PLL 41, and VCO 43, generates the carrier frequency synchronized to the reference signal frequency Ref-F.

As apparent from foregoing, when transmitting data TXD is input, Gaussian LPF 46 Gaussian low pass filters data TXD, thereby applying the low pass filtered data TXD to VCO 43. Here, Gaussian LPF 46 is used to eliminate the spurious components of the digital data to be transmitted. When the low pass filtered data is input to VCO 43, VCO 43 FSK modulates as transmitting data TXD, and then outputs it.

When transmitting data TXD is input at a constantly equal logic level, such as data "1111" or data "0000" in condition of FSK modulating and transmitting the above data TXD, the mean frequency of PLL 41 is moved, and then the oscillation frequency of VCO 43 is suddenly increased. When the oscillation frequency of VCO 43 is increased, the mean frequency of the carrier frequency and the frequency of reference signal frequency Ref-F generated from reference signal generator 39 are converted. Here, controller 31 monitors reference signal frequency Ref-F output from reference signal generator 39 via waveform shaper 37, so that the variation amount of reference signal frequency Ref-F can be detected and checked.

When reference signal frequency Ref-F of reference signal generator 39 monitored via waveform shaper 37 is converted, controller 31 outputs oscillation control pulse PWM1 having "ON/OFF" functions for controlling the variation of the carrier frequency according to the variation of the reference signal frequency. A value of oscillation control pulse PWM1 according to reference signal frequency Ref-F is stored in advance in a memory within controller 31. In order to maintain the mean frequency of the carrier frequency, oscillation control pulse PWM1 outputted from controller 31 can exactly control the mean frequency of the carrier through varying the oscillation frequency of reference signal generator 39 by being low pass filtered in integrator 35.

Additionally, when the data constantly FSK modulated is modulated and data column constantly performing a correcting operation for restoring the frequency of PLL 41 according to the FSK, is input, the reference signal frequency Ref-F is varied up to the amount of the FSK, the reference signal frequency Ref-F exists in the mean frequency even when PLL 41 varies.

As apparent from the foregoing, when FSK modulating the transmitting data TXD by use of the phase locked loop modulator, the transmitting frequency can be set to the desired channel through use of PLL 41. For example, controller 31 converts control signal PLL-CTL output to PLL 41, thereby differentiating from the frequency dividing rate of the reference signal frequency Ref-F output from reference signal generator 39, and then controlling the carrier frequency output from the VCO 43. The FSK modulated transmitting signal is power amplified to the level of the desired transmitting signal via PA 50, and is then input to LPF 52 via selection switch 45. LPF 52 low pass filters the power amplified signal, thereby eliminating the spurious components generated in VCO 43. As stated above, the low pass filtered transmitting signal is transmitted to the antenna 10 via the transmitting and receiving control switch 12, and then propagated into air.

During the receiving mode, the transmitting and receiving mode control signal TRCTL output from the controller 31, is output having a logic level opposite to that of the transmitting mode. Therefore, transmitting and receiving control switch 12 and selection switch 45 are respectively switched and connected to the receiving part. For example, transmitting and receiving mode control switch 12 is connected to VBPF 15 of the receiving part, and an output of selection switch 45 switches an output of VCO 43 to an input of mixer 21.

As stated above, when the signal propagated via antenna 10 is received, VBPF 15 band pass filters the receiving signal, thereby providing the band pass filtered signal to LNA 17. Here, VBPF 15 is constructed to be capable of varying the band pass according to the receiving channel, and is set by the control of controller 31. LNA 17 amplifies the band pass filtered receiving signal, thereby amplifying the weak signal received via antenna 10, and then provides the amplified signal to VBPF 19. VBPF 19 improves the selective possibility of the receiving channel. The receiving signal output from VBPF 19 is input to mixer 21 for eliminating the harmonic components.

Mixer 21 inputs the output of VCO 43 oscillating the carrier frequency which is phase synchronized to the reference signal frequency Ref-F generated from reference signal generator 39. Therefore, mixer 21 mixes the receiving signal amplified via LNA 17 and the carrier frequency output from VCO 43, thereby eliminating the carrier frequency in the receiving signal. The demodulated signal output from mixer 21 is low pass filtered by LPF 23 before being provided to LA 23. LPF 23 eliminates a noise signal included in the demodulated signal and the harmonic components generated during the mixing operation of image mixer 21.

Since the strength of the input signal is not constant, LA 23 amplifies the signal in order to maintain the strength of the output signal. That is, LA 23 limitedly amplifies the strength of the output signal, and then provides the amplified signal to LPF 27. LPF 27 performs an operation similar to LPF 23 and provides the filtered demodulated signal to comparator 29. Comparator 29 inputs the demodulated signal having constant strength. At this time, second integrator 33 integrating bit decision control pulse PWM2 set by controller 31, thereby providing a reference level to comparator 29. Comparator 29 compares the reference level signal with the level of the demodulated signal, thereby restoring the logic levels "1" or "0" of the original data and outputs the received digital data RXD.

In the demodulation of the signal, the receiving signal applied to mixer 21 must accurately correspond to the carrier frequency of VCO 43 for accurate demodulation. However, because draft is generated in the oscillation frequency of reference signal generator 39 or VCO 43, though PLL 41 is used for phase synchronization, it is difficult to equally maintain the carrier frequency of the receiving signal and the frequency of the VCO. In order to solve the above problem, therefore, controller 31 of the present invention can monitor the receiving data RXD restored and outputted from comparator 29, and then calculate an amount of frequency offset of the receiving data RXD. That is, controller 31 calculates the amount of frequency offset of the receiving data RXD and detects the error signal according to the calculated amount thereof. Thereafter, controller 31 controls the duty rate of oscillation control signal PWM1 pulse-demodulated in correspondence with the error signal, and then outputs it. Oscillation control signal PWM1 is converted into a direct current by integrator 35 connected to an output terminal of controller 31, thereby controlling the control voltage of reference signal generator 39. The frequency of the carrier frequency oscillated and outputted from VCO 43 is converted through the above stated operations by controller 31 and the carrier frequency of the receiving signal corresponds to the output frequency of VCO 43, so that the amount of frequency offset of the receiving data can be controlled.

Therefore, the digital radio transmission and reception system as constructed in FIG. 2, monitors the demodulated digital data, detects the frequency offset, and then calculates the amount of frequency shift keying for VCO 43 generating the current carrier frequency. After that, the frequency of reference signal generator 39 can be controlled in response to the calculated amount of frequency shift keying, to confirm the carrier frequency with the receiving carrier frequency, so that it can prevent frequency shift keying of the carrier by the fading of the receiving signal from being generated.

Also, when FSK modulating by use of the phase locked loop, the present invention can monitor the reference signal frequency generated from the reference signal generator and control the occurrence of the reference signal frequency in correspondence with the variation amount of the frequency. As a result, a frequency skip generated by open of the phase locked loop can be solved.

As apparent from the foregoing, since the present invention performs direct modulation and demodulation as opposed to the conventionally used single conversion and dual conversion, the intermediated frequency can be eliminated, so that the present invention can embody reduction and simplicity of the units of the digital radio transmission and reception system. As a result, the present invention has an advantage in that the frequency skip generated by open of the phase locked loop can be prevented and that, the amount of the frequency offset can be spontaneously controlled, thereby improving the capacity of the transmitter and receiver.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A digital radio transmission and reception system applying a direct modulation and demodulation method, comprising:
    a receiving part for selectively receiving a signal of a desired channel band, amplifying the received signal, mixing the amplified signal with a carrier frequency, subtracting a modulated signal to eliminate a carrier frequency, and then comparing the resulting signal with a reference level signal, thereby outputting demodulated digital data;
    a transmitting part for power amplifying a modulated transmitting signal, filtering spurious components and then outputting the filtered transmitting signal;
    a transmission and reception control switch for connecting an antenna to said transmitting part or said receiving part according to an input of a transmission and reception mode signal;
    a phase locked loop modulator for oscillating the carrier frequency corresponding to an oscillation control signal, outputting the oscillated carrier frequency and generating said modulated transmitting signal by frequency shift keying modulating transmitting data to a frequency band of said oscillated carrier frequency;
    a selection switch for switching an output of said phase locked loop modulator to said transmitting part or receiving part according to the transmission and reception mode signal; and
    a control part for detecting the amount of frequency offset of receiving data demodulated in said receiving part or monitoring a state of the carrier frequency oscillated from said phase locked loop modulator, thereby generating the oscillation control signal to regularly maintain said oscillated carrier frequency as well as the transmission and reception mode signal according to an operational state.

2. The digital radio transmission and reception system applying a direct modulation and demodulation method according to claim 1, wherein said phase locked loop modulator is comprised of:
    a reference signal generator for oscillating and outputting a reference signal frequency corresponding to the oscillation control signal;
    a voltage control oscillator for oscillating the carrier frequency corresponding to an oscillation control voltage, outputting said oscillated carrier frequency, generating said modulated transmitting signal by frequency shift keying said transmitting data to said frequency band of said carrier, and then outputting said modulated transmitting signal; and
    a phase locked loop for detecting difference between the phase of said oscillated carrier frequency and the phase of said reference signal frequency, thereby providing said oscillation control voltage to said voltage control oscillator.

3. The digital radio transmission and reception system applying a direct modulation and demodulation method according to claim 2, wherein said receiving part is comprised of:
    a demodulator for mixing the carrier frequency of the signal received via said antenna and said oscillated carrier frequency output from said phase locked loop modulator via said selection switch, eliminating said carrier frequency of said received signal, and then outputting the demodulated receiving signal; and
    a comparator for comparing the demodulated receiving signal output from said demodulator with a previously set reference level signal, restoring digital data, and then outputting said restored digital data to said control part.

4. The digital radio transmission and reception system applying a direct modulation and demodulation method according to claim 2, wherein said receiving part is comprised of:
    a variable band pass filter for varying a pass band in order to increase a selective possibility of a channel of a signal received via said antenna;
    a demodulator for mixing an output of said variable band pass filter and said oscillated carrier frequency output from said phase locked loop modulator via said selection switch, eliminating the carrier frequency of said receiving signal, and then outputting the demodulated receiving signal; and
    a comparator for comparing the demodulated receiving signal output from said demodulator and the reference level signal, restoring the digital data, and then outputting said restored digital data to said control part.

5. The digital radio transmission and reception system applying a direct modulation and demodulation method according to claim 4, wherein said receiving part is further comprised of a filter and a limit amplifier between said demodulator and said comparator, said filter for filtering and eliminating the carrier frequency of said receiving signal, spurious components generated by mixing with the oscillated carrier frequency output from said phase locked loop modulator, and a noise signal, and said limit amplifier for limitedly amplifying an output of said filter, thereby allowing an output level thereof be constantly maintained.

6. The digital radio transmission and reception system applying a direct modulation and demodulation method according to claim 4, wherein said control part is comprised of:

a waveform shaper for waveform shaping the reference signal frequency generated from said reference signal generator, thereby outputting a waveform shaped signal as a binarization signal;

said controller for outputting said transmission and reception mode signal corresponding to transmitting and receiving modes, calculating frequency offset of said restored digital data output from said comparator, outputting an oscillation control pulse as well as a previously set bit decision control pulse, monitoring an output of said waveform shaper, and then outputting the oscillation control pulse corresponding to a variation amount of the reference signal frequency;

a first integrator for integrating said oscillation control signal, thereby providing an oscillation control voltage of said reference signal generator;

a second integrator for integrating said bit decision control pulse, and then providing the reference level to said comparator.

7. The digital radio transmission and reception system applying a direct modulation and demodulation method according to claim 1, wherein said transmitting part is further comprised of a Gaussian low pass filter for low pass filtering the transmitting data for eliminating spurious components of the transmitting data.

8. A digital radio transmission and reception system applying direct modulation and direct demodulation, comprising:

an antenna;

a switch controlled by a transmitting and receiving mode control signal for selectively connecting said antenna to one of a receiving part and a transmitting part;

said receiving part comprising:
  first filtering means for outputting a receiving signal by band pass filtering and amplifying a received signal of a desired receiving channel;
  a mixer for generating a demodulated signal by demodulating said receiving signal passed by said first filtering means by mixing said receiving signal with an oscillated carrier frequency generated by a voltage controlled oscillator;
  second filtering means for outputting a filtered demodulated signal having a constant output level by removing high frequency noise and limit amplifying said demodulated signal; and
  a comparator for outputting received digital data by comparing said filtered demodulated signal to a reference level;

a controller for generating an oscillation control signal and a bit decision control pulse;

a first integrator for outputting a DC signal by integrating said oscillation control signal;

means responsive to said DC signal for generating an oscillator control signal for controlling said voltage controlled oscillator;

a second integrator for outputting said reference level by integrating said bit decision control signal; and said transmitting part comprising:
  a Gaussian low pass filter for outputting transmitting data by receiving digital data to be transmitted and removing spurious noise components therefrom;
  said voltage controlled oscillator outputting a FSK signal by frequency shift keying said transmitting data in response to a reference signal generated by a phase locked loop;
  power amplifying means for outputting an amplified FSK signal by amplifying said FSK signal output from said voltage controlled oscillator; and
  low pass filter means for outputting a filtered FSK signal to said switch,
  wherein said switch provides said filtered FSK signal to said antenna in response to said transmitting and receiving mode control signal.

9. The digital radio transmission and reception system applying direct modulation and direct demodulation as set forth in claim 8, wherein said first filtering means comprises:

a first variable band pass filter having an input terminal connected to an output terminal of said switch;

a low noise amplifier having an input terminal connected to an output terminal of said first variable band pass filter; and a second variable band pass filter having an input terminal connected to an output terminal of said low noise amplifier, and having an output terminal connected to an input terminal of said mixer.

10. The digital radio transmission and reception system applying direct modulation and direct demodulation as set forth in claim 8, wherein said second filtering means comprises:

a first low pass filter having an input terminal connected to an output terminal of said mixer;

a limiting amplifier having an input terminal connected to an output terminal of said low pass filter; and a second low pass filter having an input terminal connected to an output terminal of said limiting amplifier, and having an output terminal connected to an input terminal of said comparator.

11. The digital radio transmission and reception system applying direct modulation and direct demodulation as set forth in claim 8, wherein said means for generating said oscillator control signal comprises:

a reference frequency generator responsive to said DC signal for generating a reference oscillating signal;

a waveform shaper for outputting a square wave signal by shaping said reference oscillating signal, said square wave signal being provided to said controller for controlling the generation of said oscillation control pulse according to a variation amount of said reference oscillating signal; and said phase locked loop having a first input terminal for receiving said reference oscillating signal and a second input terminal connected to an output terminal of said voltage controlled oscillator; said phase locked loop outputting said reference signal to said voltage controlled oscillator in response to a comparison between said reference oscillating signal and said oscillated carrier frequency when a signal for selecting a receiving channel output from said controller is input to a control terminal of said phase locked loop and for outputting said reference signal to said voltage controlled oscillator in response to a comparison between said reference oscillating signal and said FSK signal when a signal for selecting a transmitting channel output from said controller is input to said control terminal of said phase locked loop.

12. The digital radio transmission and reception system applying direct modulation and direct demodulation as set forth in claim 11, further comprising:

a second switch controlled by said transmitting and receiving mode control signal for selectively connecting said output terminal of said voltage controlled oscillator to said mixer or said power amplifying means.

13. The digital radio transmission and reception system applying direct modulation and direct demodulation as set forth in claim 8, further comprising:

a second switch controlled by said transmitting and receiving mode control signal for selectively connecting an output terminal of said voltage controlled oscillator to said mixer or said power amplifying means.

14. A digital radio transmission and reception system applying direct modulation and direct demodulation, comprising:

an antenna;

a first switch controlled by a transmitting and receiving mode control signal for selectively connecting said antenna to one of a receiving part and a transmitting part;

said receiving part comprising:
  means for variably band pass filtering and amplifying a reception signal of a desired receiving channel received via said antenna, demodulating the amplified reception signal by mixing the amplified reception signal with an oscillated carrier frequency generated by a voltage controlled oscillator, and outputting recovered digital data by comparing the demodulated signal to a reference level signal;
  a controller for generating an oscillation control signal and a bit decision control pulse;
  a first integrator for outputting a DC signal by integrating said oscillation control signal;
  means responsive to said DC signal for generating for generating an oscillator control signal for controlling said voltage controlled oscillator;
  a second integrator for outputting said reference level signal by integrating said bit decision control signal;

said transmitting part comprising:
  said voltage controlled oscillator outputting a FSK signal by frequency shift keying digital data to be transmitted in response to a reference signal generated by a phase locked loop; and
  a second switch controlled by said transmitting and receiving mode control signal for selectively connecting an output terminal of said voltage controlled oscillator to providing said oscillated carrier frequency to said means of said receiving part or said FSK signal to said first switch.

15. The digital radio transmission and reception system applying direct modulation and direct demodulation as set forth in claim 14, said means of said receiving part comprising:

a variable band pass filter for outputting a receiving signal by band pass filtering said reception signal, said first variable band pass filter having an input terminal connected to an output terminal of said switch;

a low noise amplifier for amplifying the band passed reception signal;

a mixer for generating a demodulated signal by demodulating said amplified reception signal by mixing said amplified reception signal with said oscillated carrier frequency generated by said voltage controlled oscillator;

filtering means for outputting a filtered demodulated signal having a constant output level by removing high frequency noise and limit amplifying said demodulated signal; and a comparator for outputting said recovered digital data by comparing said filtered demodulated signal to said reference level signal.

16. The digital radio transmission and reception system applying direct modulation and direct demodulation as set forth in claim 15, wherein said means of said receiving part further comprises a second variable band pass filter having an input terminal connected to an output terminal of said low noise amplifier, and having an output terminal connected to an input terminal of said mixer.

17. The digital radio transmission and reception system applying direct modulation and direct demodulation as set forth in claim 14, said transmitting part further comprising:

a Gaussian low pass filter for outputting transmitting data by receiving said digital data to be transmitted and removing spurious noise components therefrom;

said voltage controlled oscillator outputting said FSK signal by frequency shift keying said transmitting data in response to said reference signal generated by said phase locked loop;

a power amplifier for outputting an amplified FSK signal by amplifying said FSK signal output from said voltage controlled oscillator when said second switch is controlled by said transmitting and receiving mode control signal for selectively connecting the output terminal of said voltage controlled oscillator to said power amplifier; and a low pass filter for outputting a filtered FSK signal to said first switch, wherein said switch provides said filtered FSK signal to said antenna in response to said transmitting and receiving mode control signal.

18. The digital radio transmission and reception system applying direct modulation and direct demodulation as set forth in claim 15, wherein said filtering means comprises:

a first low pass filter having an input terminal connected to an output terminal of said mixer;

a limiting amplifier having an input terminal connected to an output terminal of said low pass filter; and a second low pass filter having an input terminal connected to an output terminal of said limiting amplifier, and having an output terminal connected to an input terminal of said comparator.

19. The digital radio transmission and reception system applying direct modulation and direct demodulation as set forth in claim 14, wherein said means for generating said oscillator control signal comprises:

a reference frequency generator responsive to said DC signal for generating a reference oscillating signal;

a waveform shaper for outputting a square wave signal by shaping said reference oscillating signal, said square wave signal being provided to said controller for controlling the generation of said oscillation control pulse according to a variation amount of said reference oscillating signal; and said phase locked loop having a first input terminal for receiving said reference oscillating signal and a second input terminal connected to an output terminal of said voltage controlled oscillator; said phase locked loop outputting said reference signal to said voltage controlled oscillator in response to a comparison between said reference oscillating signal and said oscillated carrier frequency when a signal for selecting a receiving channel output from said controller is input to a control terminal of said phase locked loop and for outputting said reference signal to said voltage controlled oscillator in response to a comparison between said reference oscillating signal and said FSK signal when a signal for selecting a transmitting channel output from said controller is input to said control terminal of said phase locked loop.

* * * * *